March 14, 1961  M. I. ZWELLING  2,974,401
THREE-PHASE CORE FOR ELECTRICAL TRANSFORMERS AND
METHOD OF MANUFACTURING THE SAME
Filed June 1, 1956  3 Sheets-Sheet 1

INVENTOR.
MARTIN I. ZWELLING
BY
Chester W. Brown
ATTORNEY

March 14, 1961 M. I. ZWELLING 2,974,401
THREE-PHASE CORE FOR ELECTRICAL TRANSFORMERS AND
METHOD OF MANUFACTURING THE SAME
Filed June 1, 1956 3 Sheets-Sheet 2

*INVENTOR.*
MARTIN I. ZWELLING
BY
Chester W. Brown
ATTORNEY

March 14, 1961 M. I. ZWELLING 2,974,401
THREE-PHASE CORE FOR ELECTRICAL TRANSFORMERS AND
METHOD OF MANUFACTURING THE SAME
Filed June 1, 1956 3 Sheets-Sheet 3

INVENTOR.
MARTIN I. ZWELLING
BY
Chester W. Brown
ATTORNEY

United States Patent Office 2,974,401
Patented Mar. 14, 1961

2,974,401
THREE-PHASE CORE FOR ELECTRICAL TRANSFORMERS AND METHOD OF MANUFACTURING THE SAME

Martin I. Zwelling, Zanesville, Ohio, assignor to McGraw Electric Company, Milwaukee, Wis., a corporation of Delaware Filed June 1, 1956, Ser. No. 588,725

4 Claims. (Cl. 29—155.57)

This invention relates to improvements in a three-phase core for electrical transformers and method of manufacturing the same.

More particularly the invention pertains to a three-phase core comprising three core sections each of which is constructed by winding a magnetic ribbon on a suitable mandrel and having a preferred grain orientation affording a path favorable to magnetic flux.

Three-phase cores embodying magnetic strip material describing a spiral path about the core window have heretofore been fabricated in various designs by different methods. One such core embodies two substantially identical core sections placed in radially adjacent relation with a leg portion of one jointly forming with a leg portion of the other a middle leg of the three-phase core. A third core section of magnetic ribbon is then wound over the first two sections to form two outer three-phase legs comprising adjacent leg portions of the two core sections and third core section. This method requires rather heavy machinery, is cumbersome to perform and slows the process of fabrication.

The three-phase core herein disclosed greatly simplifies the process of fabrication, assures that the skill of the workman will be utilized to the best advantage, and affords a maximum efficiency in operation.

It is an object of this invention to provide a three-phase core comprising three core sections each of which may be individually formed by winding magnetic ribbon to a desired configuration, annealed to remove all stresses in the material, and then assembled in juxtaposed position axially relative to each other, whereon the conductive coils may be wound on the leg portions provided by the assembled core sections.

Another object is to provide a novel method of forming a three-phase magnetic core comprising the winding of three individual core sections to a desired configuration from magnetic ribbon, annealing the sections to relieve the ribbon of stress and to set the sections in the desired configuration, assembling the sections in juxtaposed relation to provide three spaced winding legs disposed in a plane common thereto, and winding conductive coils on said legs.

A further object is to provide a three-phase core comprising three core sections having three cruciform-like winding legs disposed in a plane common thereto, two of the sections being substantially identical and each wound from magnetic ribbon to provide on one side a flat contact surface and on the opposite side one half of the cruciform-like portions of the winding legs, the third section being wound or formed askew to provide on one leg a flat face on one side of the third section and on the other leg a flat face on the opposite side of the third section, each leg of the third section having the side opposite the flat side thereof of semi-cruciform-like shape, each of the three sections having the flat portion of one leg abutting the flat portion of one of the other sections in a plane common to each of the flat portions of three sections.

The three-phase core disclosed herein comprises two core sections 1 and 2, which are substantially identical and a third core section 3 which is of greater overall dimension than either of the other core sections. Each of these core sections is fabricated by winding magnetic ribbon on a mandrel conforming to a desired contour of the core section and is then annealed to relieve the ribbon of stress and to set the section so that it will retain the contour established by the mandrel during the winding operations.

Figure 4:
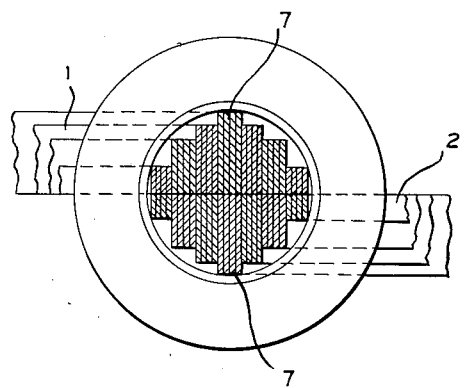
Fig. 4 is a fragmentary view showing in cross-section the middle leg of the core with a conductive coil thereon.
Figure 5:
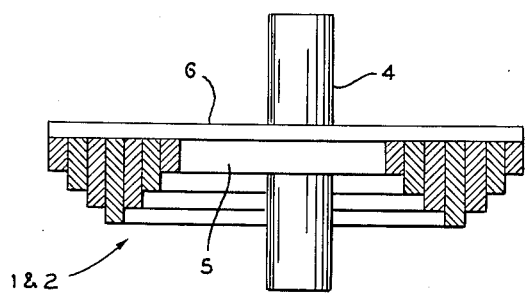
Fig. 5 illustrates a type of mandrel which may be used for winding certain of the core sections.

The core sections 1 and 2 may each be wound on a mandrel 4 having a rectangular portion 5 on which the ribbon is wound and having a flanged portion 6 against which one margin of the ribbon contacts to provide a flat face radially of the core window. When the core sections 1 and 2 have been annealed they are placed on opposite sides of a plane with the flat side of one leg of each core section juxtaposed, as shown in Figs. 2 and 4 to form the center leg of the three-phase core assembly.

Figure 1:
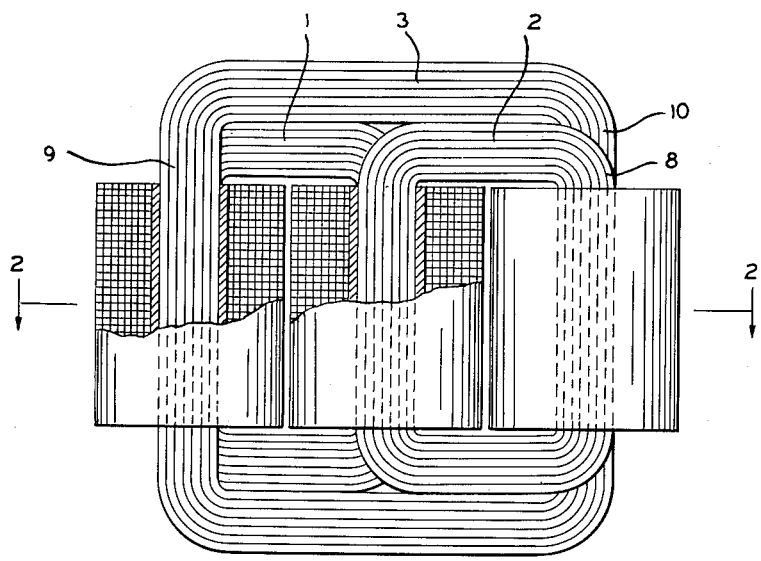
Fig. 1 is a view in side elevation illustrating a core and coil assembly.
Figure 2:
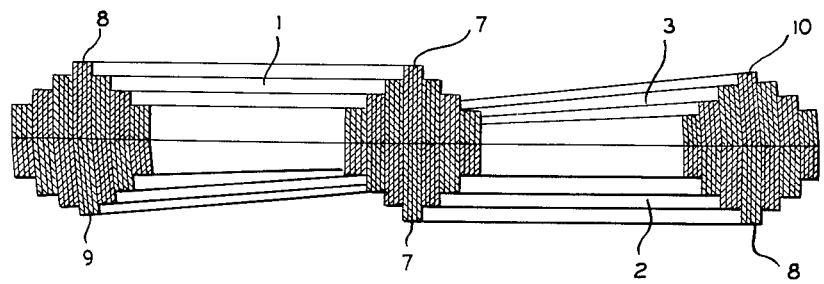
Fig. 2 is an enlarged view of the core taken on the line 2—2 of Fig. 1.
Figure 3:
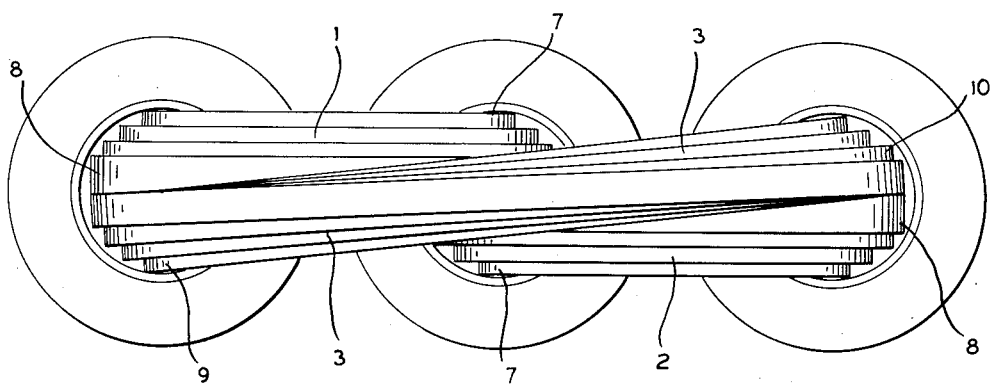
Fig. 3 is an enlarged view as seen from above relative to Fig. 1.

As will be observed in Fig. 2, the core sections are each wound of a series of ribbons each of which differs in width from that of an adjacent ribbon section to provide at the leg portions of the core sections a semi-cruciform cross-section. In the core sections 1 and 2, the flat sides of the leg portions 7 and 8 of each section is in the same plane on the same side axially of the core section. In the core section 3, the flat side of one leg portion 9 is disposed on a side axially of the core section opposite that on which the flat side of the other leg 10 is disposed.

Figure 6:
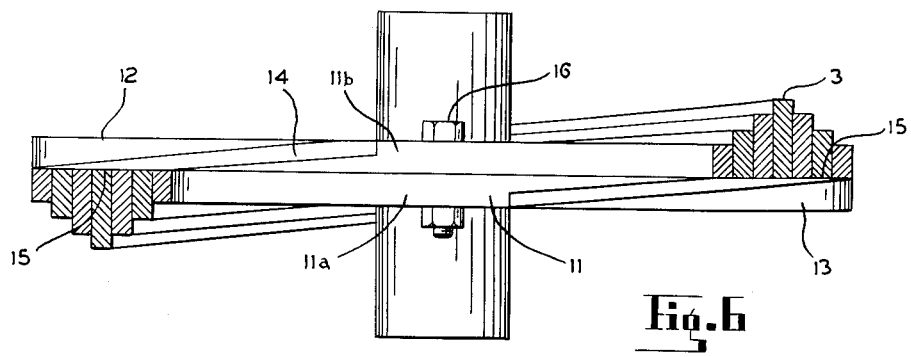
Fig. 6 illustrates a type of mandrel which may be used to wind another of the core sections.
Figure 7:
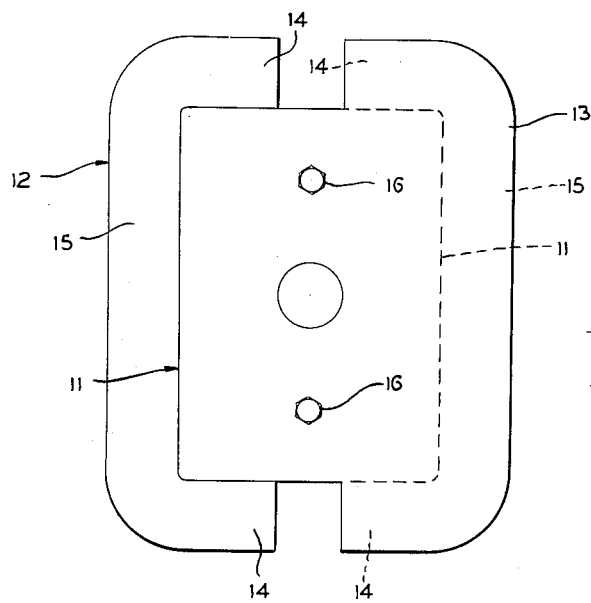
Fig. 7 is a side view of the mandrel in reduced size shown in Fig. 6.

The core section 3 may be wound on a mandrel (see Figs. 6 and 7) having a rectangular portion 11 provided with flange segments 12 and 13 disposed on opposite sides of the rectangular portion 11 relative to each other as viewed in Fig. 7 and on opposite faces of the rectangular portion relative to each other as viewed in Fig. 6. As indicated in Fig. 6, each end of each of the flange segments tapers at 14 toward the end to accommodate entrance of the ribbon as it was wound on the mandrel. The tapered portions 14 also slant inwardly of the adjacent face on the portion 11 to compensate for the different widths of the ribbon sections as the ribbon is wound on the mandrel. Intermediate the tapered ends, the flange segments are each provided with a flat face 15 disposed radially of the mandrel and serving as means by which the successive convolutions of the ribbon are aligned to provide the flat face areas of the core section 3. The inner dimension of the core section 3 between the leg portions 9 and 10 is substantially equal to the inner distance between the leg portions 8 of the core sections 1 and 2. The inner dimension between the yoke portions of the section 3 is substantially equal to the outer dimension between the yoke portions of each of the sections 1 and 2.

After the section 3 is wound, it should preferably be annealed before removal from the mandrel to eliminate the stresses set up in the ribbon during the winding operations and to set the material in the shape defined by the mandrel. To facilitate removal of the core section 3 from the type of mandrel shown, the mandrel may be in two parts 11a nad 11b clamped together by bolts as indicated at 16. When the core section 3 is completed, it may be removed from the mandrel by first removing the bolts and withdrawing the two parts of the mandrel from the core section.

Although I have illustrated a specific method for forming the respective core sections of a three-phase core, it will be obvious from this disclosure that the method may be modified to accomplish the end result herein disclosed. For instance the core section 3 may be formed in the same manner as suggested for the core sections 1 and 2 and then placed in a shaping die (not shown) which will shift the series of wound ribbon to conform to the illustrated core section 3.

After the core sections have been shaped as illustrated and annealed, they may then be assembled by placing the leg portions 7 of the sections 1 and 2 in side by side relation to provide the center leg of the three-phase core and then placing the core section 3 adjacent thereto with the leg portion 9 on the section 3 at the side of leg portion 8 on section 1 and the leg portion 10 on the section 3 at the side of leg portion 8 on section 2, or they may be assembled by first placing either section 1 or 2 in association with the section 3 as illustrated and then placing the other of said sections 1 and 2 in association with the section 3 and sections 1 or 2 as the case may be to complete the three-phase core as illustrated.

When the core sections have been assembled, they will of course be secured together in any suitable manner as by metal bands (not shown). Upon completion of the three-phase core, the electrically conductive windings 17, 18 and 19 may be wound on the legs of the core in any well known manner such as that illustrated in the patent to Steinmayer et al. 2,305,999, issued December 22, 1945, for Method and Machine for Winding Coils.

From the foregoing, it will be obvious that a novel three-phase core has been provided comprising three core sections which may be individually fabricated of wound magnetic ribbon, annealed and then assembled in side by side relationship to comprise a completed three-phase core providing three winding legs upon each of which a conductive coil may be wound.

It will also be observed from the foregoing disclosure that a simple, efficient and novel method of manufacturing a three-phase transformer core has been provided comprising the independent fabrication of three separate core sections by winding and shaping magnetic ribbon to a desired peripheral contour, annealing to remove stresses and assembling the core section in side by side relation with their contacting surfaces disposed in a plane common thereto.

It will be understood by those skilled in the art that modifications may be embodied in the disclosed core and method of manufacture without departing from the spirit of my nivention. Therefore, the appended claims are not to be interpreted specifically unless the terms thereof clearly support specific limitations.

I claim:

1. In a method of making a three-phase transformer core comprising three core sections each having a window therein, the steps including, the fabrication of two substantially identical core sections by winding in substantially rectangular contour a series of magnetic ribbon of progressively wider and then of progressively narrower widths successively with one edge of the ribbon in a plane normal to the axis of the core window and the other edge in stepped relation, the fabrication of a third core section having a window therein by winding, in substantially rectangular contour a series of magnetic ribbon of progressively wider and then of progressively narrower widths successively in a skewed path peripherally of the window of the third core section with one edge of the ribbon in one leg portion in a plane radially of the core window and the other edge of the ribbon in another leg portion in a plane radially of the core window, said third core section having two internal dimensions in mutually perpendicular directions, the internal dimension in one direction being substantially equal to the external dimension of either of said two core sections and the internal dimension in the other direction being substantially equal to the sum of the internal dimensions of said two core sections plus the width of one leg of one of said two core sections, annealing the three core sections to relieve the ribbon of stress and set them in the form defined by the winding steps, and assembling the three core sections with the planar ribbon edges of one leg portion of each contacting the planar ribbon edges of a leg portion of another core section and the planar ribbon edges of the other leg portion of each contacting the planar ribbon edges of the leg portion of still another core section, the contact between the leg portions being in a plane coinciding with the aforesaid planes.

2. In a method of making a three-phase transformer core comprising three core sections each having a window therein, the steps including, the fabrication of two substantially identical core sections by winding in substantially rectangular contour a series of magnetic ribbon of progressively wider and then of progressively narrow widths successively with one edge of the ribbon in a plane normal to the axis of the core window and the other edge in stepped relation, the fabrication of a third core section having a window therein by winding, in substantially rectangular contour a series of magnetic ribbon of progressively wider and then of progressively narrow widths successively in a skewed path peripherally of the window of said third core section with one edge of the ribbon in one leg portion in a plane radially of the core window and the other edge of the ribbon in another leg portion in a plane radially of the core window, said third core section having two internal dimensions in directions at right angles to each other, the internal dimension in one direction being substantially equal to the external dimension of either of said two core sections and the internal dimension in the other direction being substantially equal to the sum of the internal dimensions of said two core sections plus the width of one leg of one of said two core sections annealing the three core sections to relieve the ribbon of stress and set them in the form defined by the winding steps, assembling the three core sections with the planar ribbon edges of one leg portion of each contacting the planar ribbon edges of a leg portion of another core section and the planar ribbon edges of the other leg portion of each contacting the planar ribbon edges of the leg portion of still another core section, the contact between the leg portion being in a plane coinciding with the aforesaid planes, and winding electrically conductive coils on each leg of said core thus assembled.

3. In a method of making a three-phase transformer core, the steps including, the fabrication of two substantially identical core sections each having a window therein by winding and shaping magnetic ribbon in substantially rectangular contour with one edge of the ribbon disposed in a plane normal to the axis of the window of the core sections to provide a substantially flat radial face on each section, the fabrication of a third core section having a window therein by winding and shaping magnetic ribbon in substantially rectangular contour having two internal dimensions in directions at right angles to each other, the internal dimension in one of said directions being substantially equal to the sum of the internal dimensions of said two core sections plus the width of one leg of one of said two core sections and the internal dimension in the other of said directions being substantially equal to the external dimension of either of said two core sections, said ribbon being disposed in a skewed path about the window of said third core section to provide on one face of one leg portion a substantially flat radial face and on the opposite face of the other leg portion a similar radial face, annealing the core sections to remove stresses in and set the ribbon in its fabricated form, assembling the two core sections on opposite sides of a common plane with their respective flat faces coincident therewith and the third core section with the flat faces of its leg portions coincident with said common plane, and disposing one leg portion of each of said two core sections adjacent to and in contact with each other and disposing the other leg portions of said two core sections, one adjacent to and in contact with a leg portion of said third core section and another adjacent to and in contact with the remaining leg portion of the third core section.

4. In a method of making a three-phase transformer core, the steps including, the fabrication of two substantially identical core sections each having a window therein by winding and shaping magnetic ribbon in substantially rectangular contour with one edge of the ribbon disposed in a plane normal to the axis of the windows of the core sections to provide a substantially flat radial face on each section, the fabrication of a third core section having a window therein by winding and shaping magnetic ribbon in substantially rectangular contour having two internal dimensions in directions at right angles to each other, the internal dimension in one of said directions being substantially equal to the sum of the internal dimensions of said two core sections plus the width of one leg of one of said two core sections and the internal dimension in the other of said directions being substantially equal to the external dimension of either of said two core sections, said ribbon being disposed in a skewed path about the window of said third core section, to provide on one face of one leg portion a substantially flat radial face and on the opposite face of the other leg portion a similar radial face, annealing the core sections to remove stresses in and set the ribbon in its fabricated form, assembling the two core sections on opposite sides of a common plane with their respective flat faces coincident therewith and the third core section with the flat faces of its leg portions coincident with said common plane, and disposing one leg portion of each of said two core sections adjacent to and in contact with each other and disposing the other leg portions of said two core sections, one adjacent to and in contact with a leg portion of said third core section and another adjacent to and in contact with the remaining leg portion of the third core section and winding a conductive coil about and embracing adjacent pairs of said leg portions.

References Cited in the file of this patent

UNITED STATES PATENTS

| | | |
|---|---|---|
| 2,344,294 | Evans | Mar. 14, 1944 |
| 2,404,016 | Weigand | July 16, 1946 |
| 2,407,391 | Woolfolk | Sept. 10, 1946 |
| 2,431,128 | Link | Nov. 18, 1947 |
| 2,516,164 | Vienneau | July 25, 1950 |
| 2,542,806 | Zimsky | Feb. 20, 1951 |
| 2,543,089 | Ford et al. | Feb. 27, 1951 |
| 2,579,578 | Horstman et al. | Dec. 25, 1951 |
| 2,908,880 | Steinmayer et al. | Oct. 13, 1959 |

UNITED STATES PATENT OFFICE
CERTIFICATION OF CORRECTION

Patent No. 2,974,401                              March 14, 1961

Martin I. Zwelling

It is hereby certified that error appears in the above numbered patent requiring correction and that the said Letters Patent should read as corrected below.

In the grant, lines 2 and 3, for "assignor to McGraw Electric Company, of Milwaukee, Wisconsin, a corporation of Delaware," read -- assignor to McGraw-Edison Company, a corporation of Delaware, --; line 12, for "McGraw Electric Company, its successors" read -- McGraw-Edison Company, its successors --; in the heading to the printed specification, lines 5, 6, and 7, for "assignor to McGraw Electric Company, Milwaukee, Wis., a corporation of Delaware" read -- assignor to McGraw-Edison Company, a corporation of Delaware --; column 4, lines 26, and 32, for "narrow", each occurrence, read -- narrower --.

Signed and sealed this 12th day of September 1961.

(SEAL)
Attest:

ERNEST W. SWIDER

Attesting Officer

DAVID L. LADD

Commissioner of Patents

Attest: